United States Patent
Chang et al.

(10) Patent No.: US 10,002,609 B2
(45) Date of Patent: Jun. 19, 2018

(54) DEVICE AND METHOD FOR GENERATING RECOGNITION NETWORK BY ADJUSTING RECOGNITION VOCABULARY WEIGHTS BASED ON A NUMBER OF TIMES THEY APPEAR IN OPERATION CONTENTS

(71) Applicant: Industrial Technology Research Institute, Hsinchu (TW)

(72) Inventors: Hsin-Chang Chang, Changhua County (TW); Jiang-Chun Chen, Taichung (TW); Chih-Chung Kuo, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 752 days.

(21) Appl. No.: 14/541,116

(22) Filed: Nov. 13, 2014

(65) Prior Publication Data
US 2015/0179171 A1 Jun. 25, 2015

(30) Foreign Application Priority Data
Dec. 24, 2013 (TW) .............................. 102147889 A (51) Int. Cl.
G10L 15/00 (2013.01)
G06F 17/20 (2006.01)
(Continued)

(52) U.S. Cl.
CPC .............. *G10L 15/22* (2013.01); *G10L 15/32* (2013.01); *G10L 15/063* (2013.01); *G10L 15/065* (2013.01)

(58) Field of Classification Search
CPC ...... G10L 15/065; G10L 15/063; G10L 15/22
(Continued)

(56) References Cited

U.S. PATENT DOCUMENTS 6,122,361 A 9/2000 Gupta
6,370,503 B1 4/2002 Ortega et al.
(Continued)

FOREIGN PATENT DOCUMENTS

CN 101388011 3/2009
CN 102737629 10/2012
(Continued)

OTHER PUBLICATIONS

Taiwan Patent Office, Office Action, Patent Application Serial No. 102147889, dated Jun. 11, 2015, Taiwan.
(Continued)

*Primary Examiner* — Farzad Kazeminezhad (57) ABSTRACT

A recognition network generation device, disposed in an electronic device, comprising: an operation record storage device storing a plurality of operation records of the electronic device, wherein each of the operation records includes operation content executed by the electronic device and device peripheral information detected by the electronic device when the electronic device executes the operation content; an activity model constructor classifying the operation records into a plurality of activity models according to all the device peripheral information of the operation records; an activity predictor selecting at least one selected activity model according to the degree of similarity between each of the activity models and a current device peripheral information detected by the electronic device; and a weight adjustor adjusting the weights of a plurality of recognition vocabularies by taking into account a number of times each recognition vocabulary appears in all operations contents of the activity models, wherein the recognition vocabularies correspond to all the operation content of the at least one selected activity model.

15 Claims, 6 Drawing Sheets

(51) Int. Cl.
*G10L 15/22* (2006.01)
*G10L 15/32* (2013.01)
*G10L 15/06* (2013.01)
*G10L 15/065* (2013.01)

(58) Field of Classification Search
USPC .................................................. 704/8, 246
See application file for complete search history.

(56) References Cited

U.S. PATENT DOCUMENTS

| | | | |
|---|---|---|---|
| 6,436,547 | B1 | 8/2002 | Toft et al. |
| 6,856,957 | B1* | 2/2005 | Dumoulin ............... G10L 15/22 379/88.01 |
| 7,752,152 | B2 | 7/2010 | Paek et al. |
| 7,882,056 | B2 | 2/2011 | Begole et al. |
| 8,032,375 | B2 | 10/2011 | Chickering et al. |
| 8,244,545 | B2 | 8/2012 | Paek et al. |
| 2007/0005354 | A1 | 1/2007 | Potter et al. |
| 2008/0300870 | A1 | 12/2008 | Hsu et al. |
| 2009/0234655 | A1 | 9/2009 | Kwon |
| 2011/0022292 | A1 | 1/2011 | Shen et al. |
| 2011/0295590 | A1* | 12/2011 | Lloyd ................... G10L 15/065 704/8 |
| 2012/0265528 | A1 | 10/2012 | Gruber et al. |
| 2012/0316878 | A1 | 12/2012 | Singleton et al. |
| 2013/0030804 | A1 | 1/2013 | Zavaliagkos et al. |
| 2013/0080156 | A1 | 3/2013 | Nakata |
| 2014/0278415 | A1* | 9/2014 | Ivanov ................. G10L 15/063 704/246 |

FOREIGN PATENT DOCUMENTS

| | | |
|---|---|---|
| CN | 103177721 | 6/2013 |
| TW | 200941257 A | 11/1997 |
| TW | 548630 | 8/2003 |
| TW | I311311 | 6/2009 |
| TW | 201022964 A1 | 6/2010 |

OTHER PUBLICATIONS

China Patent Office, Office Action, Patent Application Serial No. 201310746425.2, dated May 4, 2017, China.

Hazen, Timothy J., "A Comparison of Novel Techniques for Rapid Speaker Adaptation," Speech Communication, May 2000, pp. 15-33, vol. 31, Issue 1, Elsevier, US.

Koichi Shinoda et al., "Structural MAP Speaker Adaptation Using Hierarchical Priors," Automatic Speech Recognition and Understanding, Dec. 1997, pp. 381-388, IEEE, US.

Mark Gales et al. "The Application of Hidden Markov Models in Speech Recognition," Foundations and Trends in Signal Processing, Feb. 2008, pp. 195-304, vol. 1, Issue 3, Now Publishers, Inc., US.

Povey, Daniel, "Discriminative Training for Large Vocabulary Speech Recognition," PhD Thesis, Mar. 2003, 158 pages, Cambridge University Engineering Dept., US.

Meghdad Aynehband et al., "COAST: Context-Aware Pervasive Speech Recognition System," Wireless and Pervasive Computing, 2011 6th International Symposium, Feb. 2011, pp. 1-4, IEEE, US.

Daniel Riboni et al., "COSAR: Hybrid Reasoning for Context-Aware Activity Recognition," Journal Personal and Ubiquitous Computing, Mar. 2011, pp. 271-289, vol. 15, Issue 3, ACM Digital Library, US.

* cited by examiner

DEVICE AND METHOD FOR GENERATING RECOGNITION NETWORK BY ADJUSTING RECOGNITION VOCABULARY WEIGHTS BASED ON A NUMBER OF TIMES THEY APPEAR IN OPERATION CONTENTS

CROSS REFERENCE TO RELATED APPLICATION

The present application is based on, and claims priority from, Taiwan (International) Application Serial Number 102147889, filed Dec. 24, 2013, the disclosure of which is hereby incorporated by reference herein in its entirety.

TECHNICAL FIELD

The technical field relates to a device and method for generating a recognition network, and more particularly to a recognition network generation device for enhancing the recognition rate of speech recognition.

BACKGROUND

Nowadays a variety of intelligent electronic devices have been proposed. Users have also become increasingly dependent on the functions provided by the intelligent electronic devices in their daily lives. However, users often have different operating behaviors because of different personal habits or preferences in the use of the applications of the intelligent electronic devices. For example, some users prefer listening to several of the 2000 songs stored in the intelligent electronic device; or has only a few friends that are frequently contacted, yet there are 500 contacts in the address book. Therefore, how to determine the frequently used functions of an intelligent electronic device according to device peripheral information and the operational records of the intelligent electronic device is an issue.

SUMMARY

An embodiment of the present disclosure provides a recognition network generation device. The recognition network generation device disposed in an electronic device includes an operation record storage device, an activity model constructor, an activity predictor and a weight adjustor. The operation record storage device stores a plurality of operation records of the electronic device, wherein each of the operation records includes an operation content executed by the electronic device and device peripheral information detected by the electronic device when the electronic device executes the operation content. The activity model constructor coupled to the operation record storage device classifies the operation records into a plurality of activity models according to all the device peripheral information of the operation records. The activity predictor selects at least one selected activity model from all the activity models according to the degree of similarity between each of the activity models and the current device peripheral information detected by the electronic device. The weight adjustor adjusts the weights of a plurality of recognition vocabularies, wherein the recognition vocabularies correspond to all the operation contents in the at least one selected activity model.

An embodiment of the present disclosure provides a recognition network generation method. The recognition network generation method includes the steps of: storing, by an operation record storage device, a plurality of operation records of an electronic device, wherein each of the operation records includes an operation content executed by the electronic device and device peripheral information detected by the electronic device when the electronic device executes the operation content; classifying, by an activity model constructor, the operation records into a plurality of activity models according to all the device peripheral information of the operation records; selecting, by an activity predictor, at least one selected activity model from all the activity models according to the degree of similarity between each of the activity models and the current device peripheral information detected by the electronic device; and adjusting, by a weight adjustor, the weights of a plurality of recognition vocabularies, wherein the recognition vocabularies correspond to all the operation contents in the at least one selected activity model.

An embodiment of the present disclosure provides a recognition network generation device. The recognition network generation device disposed in an electronic device includes a storage unit, a recognizer and a processor. The storage unit stores a plurality of operation records of the electronic device, wherein each of the operation records includes an operation executed by the electronic device and device peripheral information detected by the electronic device when the electronic device executes the operation content. The processor coupled to the storage unit loads and executes a recognition network generation program which includes the steps of: classifying, by the processor, the operation records into a plurality of activity models according to all the device peripheral information of the operation records; selecting, by the processor, at least one selected activity model from all the activity models according to the degree of similarity between each of the activity models and the current device peripheral information detected by the electronic device; adjusting, by the processor, the weights of a plurality of recognition vocabularies, wherein the recognition vocabularies correspond to all the operation contents in the at least one selected activity model; and recognizing, by the recognizer, speech input by weight adjustment information and outputting a speech recognition result.

An embodiment of the present disclosure provides a non-transient computer-readable storage medium. The non-transient computer-readable storage medium storing program instructions for generating a recognition network, wherein the program instructions are executable to: store, by an operation record storage device, a plurality of operation records of an electronic device, wherein each of the operation records comprises an operation content which is executed by the electronic device and a device peripheral information detected by the electronic device when the electronic device executes the corresponding operation content; classify, by an activity model constructor, the operation records into a plurality of activity models according to all the device peripheral information of the operation records; select, by an activity predictor, at least one selected activity model from all activity models according to the degree of similarity between each of the activity models and a current device peripheral information detected by the electronic device; and adjust, by a weight adjustor, the weights of a plurality of recognition vocabularies, wherein the recognition vocabularies correspond to all the operation content of the at least one selected activity model.

BRIEF DESCRIPTION OF THE DRAWINGS

The present disclosure can be more fully understood by reading the subsequent detailed description and examples with references made to the accompanying drawings, wherein.

DETAILED DESCRIPTION

Figure 1:
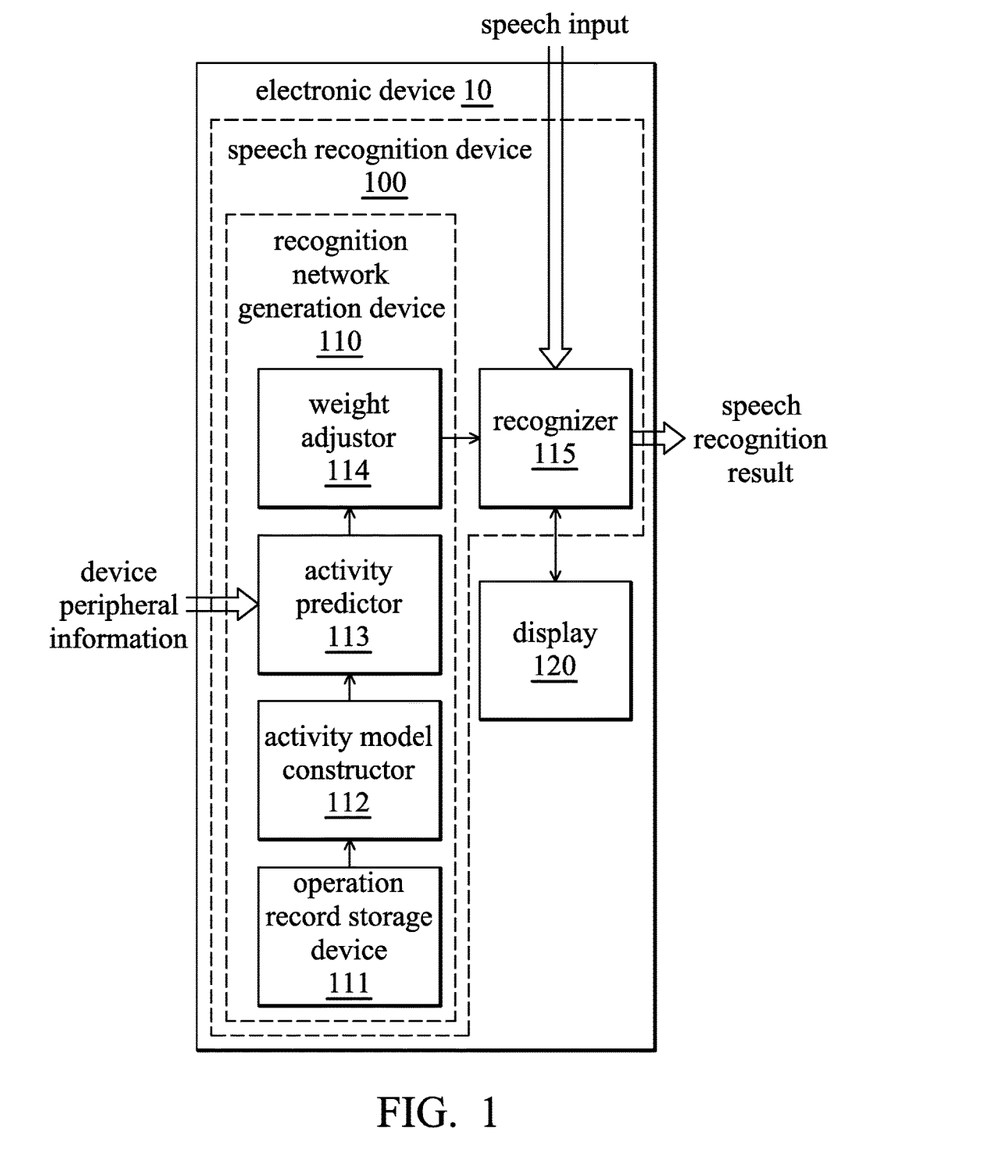
FIG. 1 is a schematic diagram showing an electronic device 10 with a speech recognition device 100 provided according to an embodiment of the present disclosure.

The following description is of the best-contemplated mode of carrying out the present disclosure. This description is made for the purpose of illustrating the general principles of the present disclosure and should not be taken in a limiting sense. The scope of the present disclosure is best determined by reference to the appended claims FIG. 1 is a schematic diagram showing an electronic device 10 with a speech recognition device 100 provided according to an embodiment of the present disclosure. The electronic device 10 includes the speech recognition device 100 and a display 120. The speech recognition device 100 outputs a speech recognition result according to a speech input and the current device peripheral information detected by the electronic device 10. The speech recognition device 100 includes a recognition network generation device 110 and a recognizer 115. The recognition network generation device 110 includes an operation record storage device 111, an activity model constructor 112, an activity predictor 113 and a weight adjustor 114. The operation record storage device 111 is coupled to the activity model constructor 112. The activity predictor 113 is coupled to the activity model constructor 112 and the weight adjustor 114. The activity predictor 113 receives the current device peripheral information and a plurality of activity models output by the activity model constructor 112 and outputs at least one selected activity model to the weight adjustor 114. The weight adjustor 114 outputs the weight adjustment information according to the at least one selected activity model, wherein the weight adjustment information is used to update a recognition network. The recognizer 115 is coupled to the weight adjustor 114 and the display 120. The recognizer 115 receives the weight adjustment information and the speech input. Finally, the recognizer 115 recognizes the speech input based on the weight adjustment information and outputs the speech recognition result.

Table. 1 and Table. 2 illustrate the contents of a plurality of operation records stored in the operation record storage device 111, wherein each of the operation records comprises operation content previously executed by the electronic device 10 and device peripheral information detected by the electronic device 10 when the electronic device 10 executes the corresponding operation content. In this embodiment, the operation record storage device 111 is used to store a plurality of operation records when a user operates the electronic device 10. Each of the operation records includes a behavior record, which is a record of operating the electronic device 10, and a current status of the electronic device 10 under operation. Each of the operation content shown in Table. 1 represents a behavior record executed by the electronic device 10. Each of the device peripheral information shown in Table. 2 represents the current status of the electronic device 10 under operation (i.e. the electronic device 10 detects the current device peripheral information while executing the corresponding operation content). Each of the operation content includes an application title, a function vocabulary, a target vocabulary or an operation mode, wherein both of the function vocabulary and the target vocabulary comprises recognition vocabularies corresponding to the operation content, and the operation mode represents the control method when the user operates the corresponding application. Each of the device peripheral information includes a sensing device status, a time status, a position status, a moving status, a wireless transmission interface status or a wired transmission interface status of the electronic device 10; but the embodiment of the present disclosure is not limited thereto.

TABLE 1 operation content

| No. | Application title | Function vocabulary | Target vocabulary | Operation mode |
|---|---|---|---|---|
| 1 | Music | Play | singer Mary | Touch |
| 2 | Telephone | Call | Mike | Speech |
| 3 | Stock | Inquiry | food company | Touch |
| 4 | Radio | Turn on | broadcasting station A | Touch |
| 5 | Weather | Inquiry | tomorrow morning | Speech |
| 6 | Music | Play | Heartbeats | Touch |
| 7 | Music | Play | Nocturne | Touch |
| 8 | Music | Open | Nursery rhyme | Touch |
| ... | ... | ... | ... | ... |
| Z-4 | Telephone | X | Kevin | Speech |
| Z-3 | Music | Play | X | Touch |
| Z-2 | Electronic map | Location | Staple center | Speech |
| Z-1 | Electronic map | Location | Hollywood | Speech |
| Z | Weather | Inquiry | Tonight | Touch |

TABLE 2

Device peripheral information

| No. | Time status | Position status | Wireless transmission interface status | Wired transmission interface status |
|---|---|---|---|---|
| 1 | Saturday Morning | Moving | 3G | Car receptacle |
| 2 | Monday Morning | Moving | 3G | Car receptacle |
| 3 | Tuesday Afternoon | Moving | 3G | Car receptacle |
| 4 | Tuesday Afternoon | Staying | 3G | X |
| 5 | Wednesday Afternoon | Staying | 3G | X |
| 6 | Thursday Morning | Staying | Wi-Fi | Laptop cable |
| 7 | Thursday Morning | Staying | Wi-Fi | Laptop cable |
| 8 | Friday Afternoon | Staying | 3G | X |
| ... | ... | ... | ... | ... |
| Z-4 | Thursday Morning | Moving | 3G | Car receptacle |
| Z-3 | Thursday Afternoon | Staying | 3G | X |
| Z-2 | Saturday Morning | Moving | 3G | Car receptacle |
| Z-1 | Sunday Afternoon | Moving | 3G | Car receptacle |
| Z | Monday Afternoon | Staying | Wi-Fi | Laptop cable |

In this embodiment, the No. 1 operating record shown in Table. 1 and Table. 2 represents the user operating the electronic device 10 (for example, a smart phone or tablet PC . . . etc.) while driving a vehicle, wherein the user selects the singer Mary's song by touching the display 120 of the electronic device 10 and the electronic device 10 detects and collects the corresponding device peripheral information. Then the operation record storage device 111 stores the No. 1 operating record. The No. 1 operating record includes an operation content and the corresponding device peripheral information, wherein the operation content includes "Music" (application title), "Play" (function vocabulary), "Mary" (target vocabulary) and "Touch" (operation mode) and the device peripheral information includes "Saturday afternoon" (time status), "Moving" (moving status), "3G" (wireless transmission interface status) and "Car receptacle" (wired transmission interface status).

The application title shown in Table. 1 includes all the software names which can be operated in the electronic device 10, for example, music, weather information, games, stock information, GPS . . . etc. The function vocabulary represents the action name while executing the application and the target vocabulary represents the execution object of the function vocabulary. Every operation on the electronic device 10 can be recorded by distinguishing the corresponding function vocabulary, target vocabulary or application title, for example, "inquiry (function vocabulary) the stock information (application title—stock) of food company (target vocabulary)" or "please call (function vocabulary) Mike (target vocabulary) (application title—phone)". Therefore the operation record storage device 111 records an operation content and device peripheral information as an operation record once the user operates one of the applications.

An embodiment of the present disclosure illustrates the activity model constructor 112 how to classify the operation content into a plurality of activity models. First, the activity model constructor 112 loads all the operation records stored in the operation record storage device 111. The activity model constructor 112 converts each of the device peripheral information into a characteristic data respectively. In this embodiment, the characteristic data is a characteristic vector. Using No. 1 and No. 7 operation records of Table. 1 and Table. 2 as an example, the activity model constructor 112 converts the device peripheral information of No. 1 operation record into a characteristic vector $X_1=[7.7,8,3,5]$ and converts the device peripheral information of No. 7 operation record into a characteristic vector $X_7=[4.9,3,8,10]$. Similarly, the activity model constructor 112 converts all the device peripheral information of No. 1~Z operation records shown in Table. 1 and Table. 2 into a plurality of characteristic vectors $X_1$~$X_Z$. The activity model constructor 112 classifies the characteristic vectors $X_1$~$X_Z$ into K groups according to the features of the characteristic vectors $X_1$~$X_Z$. More precisely, the activity model constructor 112 classifies the characteristic vectors $X_1$~$X_Z$ into a plurality of activity models according to the degree of similarity between all the characteristic vectors $X_1$~$X_Z$, wherein each of the activity models generates a representative characteristic data respectively.

In this embodiment, the activity model constructor 112 applies the LBG K-means algorithm to classify the characteristic vectors $X_1$~$X_Z$. However, the present disclosure is not limited to the LBG K-means algorithm but the K-means algorithm or the KNN (K-Nearest Neighbor) algorithm. Therefore the activity model constructor 112 applies the above algorithms to classify the characteristic vectors $X_1$~$X_Z$ into a plurality of activity models according to the degree of similarity between all the characteristic vectors $X_1$~$X_Z$. After classifying (for example, into K groups), the activity model constructor 112 calculates an average data for each group of characteristic vectors as a representative characteristic data respectively. In this embodiment, the representative characteristic data are the representative characteristic vectors $Y_1$~$Y_K$. Finally, the activity model constructor 112 constructs K activity models $M_1$~$M_K$ according to the classifying result, wherein each of the activity models $M_i$ (i=1~K) includes a representative characteristic vector $Y_i$ (i=1~K), the characteristic vectors classified into the i-th group and the operation content corresponding to the characteristic vectors classified into the i-th group.

Figure 2:
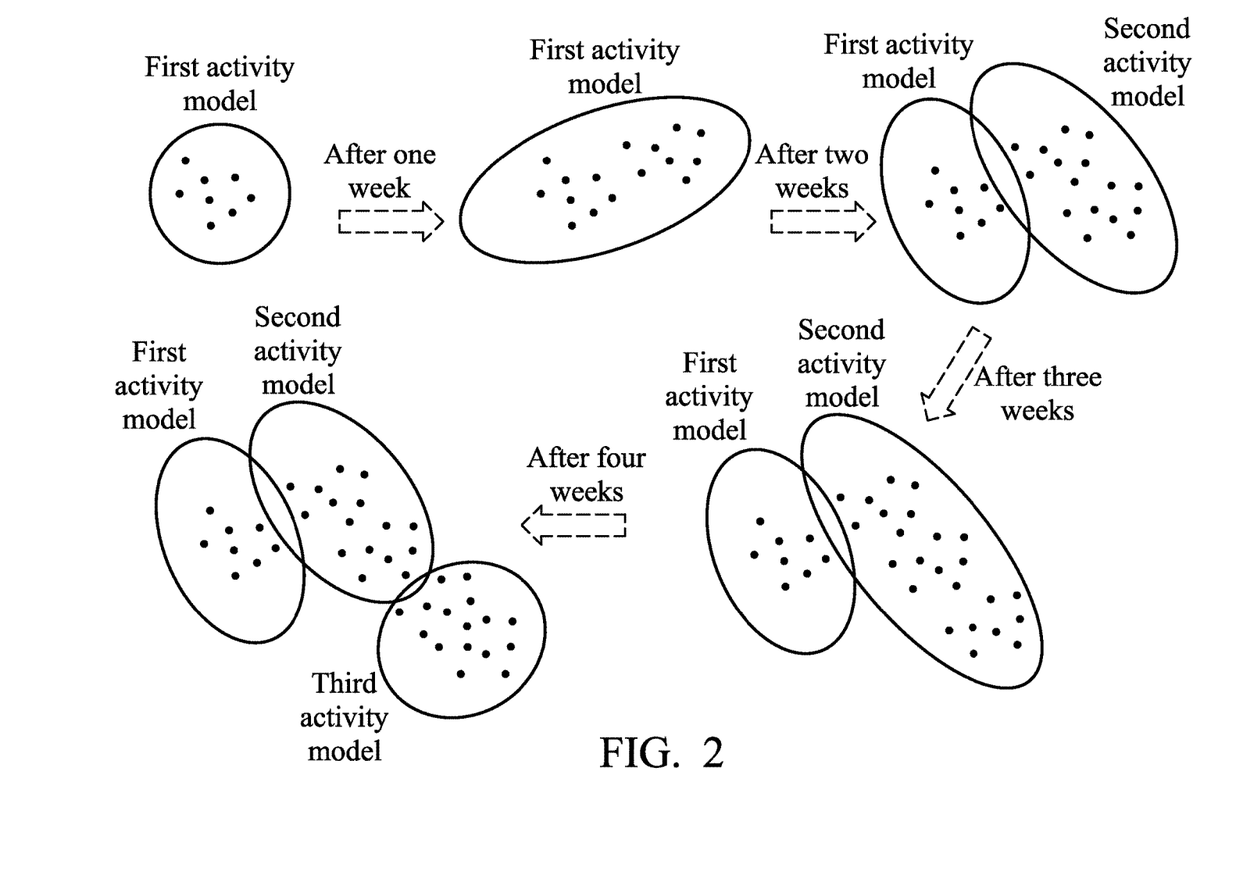
FIG. 2 shows the activity model constructor 112 and the classifying results of all the characteristic vectors at different times.

FIG. 2 shows the activity model constructor 112 and the classifying results of all the characteristic vectors at different times. As shown in FIG. 2, the activity model constructor 112 increases by 7 operation records after a week. This is because the operation record storage device 111 continues recording new operation records generated by the electronic device 10 and then transmits the new operation records to the activity model constructor 112. When the operation record storage device 111 records new operation content and the corresponding device peripheral information, the activity model constructor 112 generates a new characteristic vector $X_j$ afterward. Then the activity model constructor 112 classifies all the characteristic vectors through, for example, the LBG K-means algorithm. Therefore FIG. 2 shows the classifying results corresponding to different times (after one week, after two weeks, after three weeks and after four weeks), wherein each of the points in the activity model constructor 112 represents a characteristic vector.

In the embodiment of FIG. 2, the activity model constructor 112 constructs a first activity model according to the current operation records. After two weeks, the activity model constructor 112 applies the LBG K-means algorithm to classify all the characteristic vectors into two groups and constructs the corresponding first and second activity models. This is because the characteristic of the LBG K-means algorithm is dividing the activity model included the largest number of characteristic vectors into two activity models. After three weeks, the second activity model has more characteristic vectors than the first activity model and the characteristic vectors of the second activity model have a greater difference. Finally, the activity model constructor 112 also applies the LBG K-means algorithm to classify all the characteristic vectors into three groups and constructs the new corresponding first, second and third activity models.

An embodiment of the present disclosure illustrates the activity predictor 113 selecting at least one selected activity model from all activity models $M_i$ (i=1~K) according to the degree of similarity between each of the activity models $M_i$ (i=1~K) and the current device peripheral information detected by the electronic device 10. First, the activity predictor 113 receives the current device peripheral information detected by the electronic device 10 and the activity models $M_i$ (i=1~K) output by the activity model constructor 112. The activity predictor 113 converts the current device peripheral information into a current characteristic data. In this embodiment, the current characteristic data is a current characteristic vector $X_C$. Then the activity predictor 113 calculates a similarity coefficient $C_i$ (i=1~K) of each activity model according to the degree of similarity between each of the representative characteristic vectors $Y_1$~$Y_K$ and the current characteristic vector $X_C$, wherein the calculation of the similarity coefficient $C_i$ (i=1~K) can be determined by the following equation:

$$C_i = 1/|X_C - Y_i|^2,$$

wherein $|X_C - Y_i|^2$ is the 2-norm value between the current characteristic vector $X_C$ and the representative characteristic vectors $Y_i$ (i=1~K).

Finally, the activity predictor 113 generates a sorted result for the activity models $M_i$ (i=1~K) by arranging the similarity coefficient $C_i$ (i=1~K) in a descending order. Then the activity predictor 113 selects the first N activity models $M_i$ (i=1~N) of the sorted result as the at least one selected activity model $M_{Cm}$ (m=1~N).

Figure 3A:
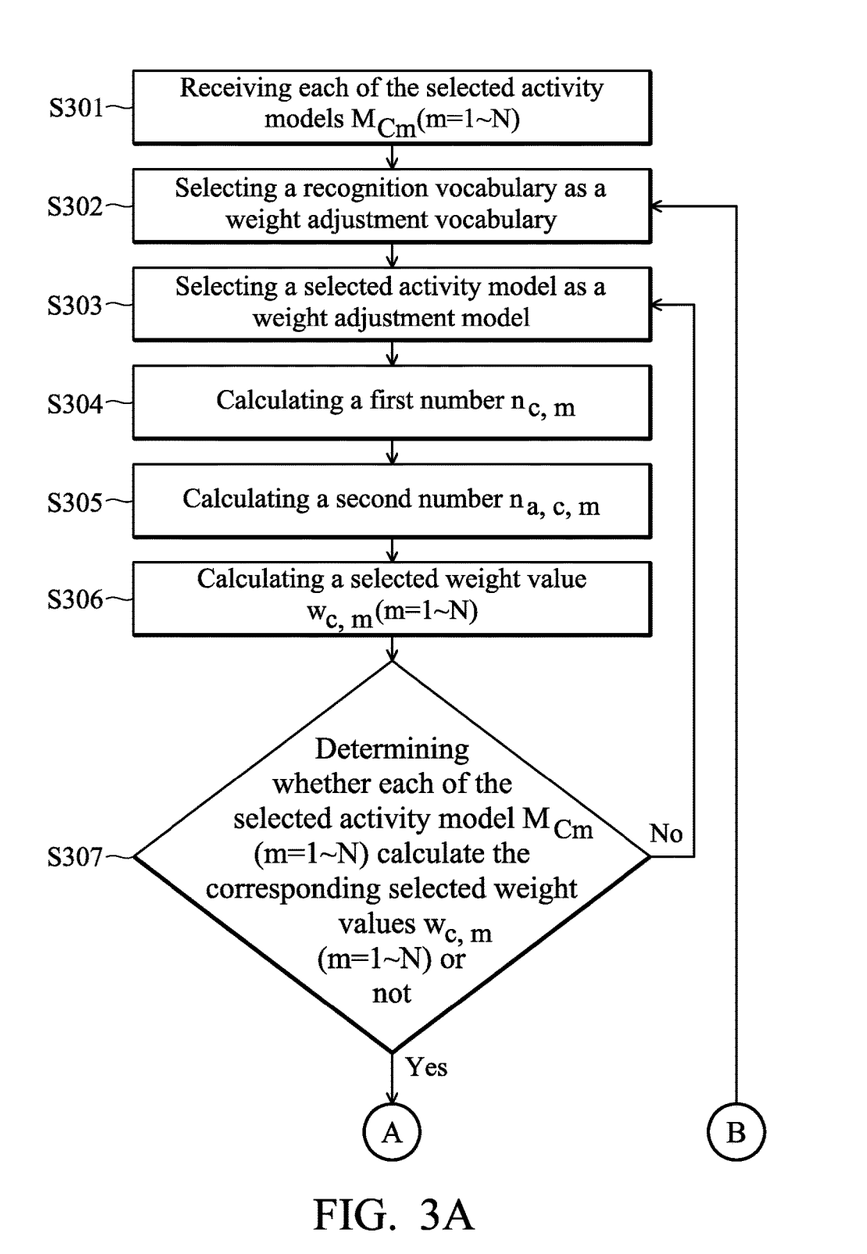
FIG. 3A and FIG. 3B show a flow diagram to illustrate how the weight adjustor 114 adjusts the weights of a plurality of recognition vocabularies, wherein the recognition vocabularies are selected from every operation content corresponding to all the selected activity models $M_{C\_m}(m=1\sim N)$.
Figure 3B:
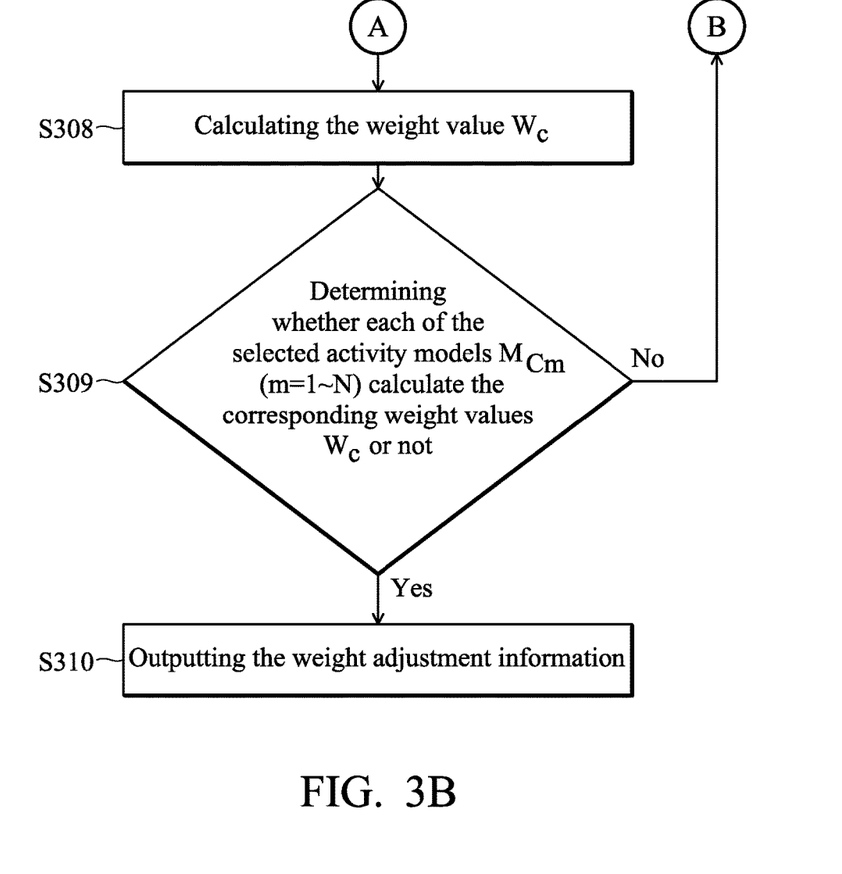

FIG. 3A and FIG. 3B show a flow diagram illustrating how the weight adjustor 114 adjusts the weights of a plurality of recognition vocabularies, wherein the recognition vocabularies are selected from each of the operation content contained in the at least one selected activity model $M_{Cm}$ (m=1~N). The recognition vocabulary indicated in this embodiment represents the target vocabulary or the function vocabulary. In step S301, the weight adjustor 114 receives each of the selected activity models $M_{Cm}$ (m=1~N) output by the activity predictor 113. As mentioned above, every selected activity model $M_{Cm}$ includes a representative characteristic vector $Y_m$, the characteristic vectors in the m-th group and the operation content in the m-th group.

In step S302, the weight adjustor 114 selects a recognition vocabulary from each of the operation content contained in the at least one selected activity model $M_{Cm}$ (m=1~N) as a weight adjustment vocabulary C. Then the weight adjustor 114 adjust the weight value of the weight adjustment vocabulary C according to a first number $n_{c,m}$ and a second number $n_{a,c,m}$, wherein the first number $n_{c,m}$ is defined as the number of times that the recognition vocabulary appears in each of the operation content of the at least one selected activity model $M_{Cm}$ (m=1~N) and the second number $n_{a,c,m}$ is defined as the number of times that the application titles appear in each of the operation content of the at least one selected activity model $M_{Cm}$ (m=1~N). For example, the activity predictor 113 selects three selected activity models $M_{Cm}$ (m=1-3) according to the operation records shown in Table. 1 and Table. 2, wherein the selected activity models $M_{C1}$, $M_{C2}$ and $M_{C3}$ include No. 1-3, 5-15, (Z-2) and (Z-1) operation content. The weight adjustment vocabulary C is the function vocabulary "Location". Then the weight adjustor 114 selects the function vocabulary "Location" as the weight adjustment vocabulary "Location".

In step S303, the weight adjustor 114 selects a selected activity model as a weight adjustment model. In step S304, the weight adjustor 114 finds out the number of times the weight adjustment vocabulary C appears in each of the operation content of the at least one selected activity model $M_{Cm}$ (m=1~N) as the first number $n_{c,m}$.

Using the same example as shown above, the weight adjustor 114 selects the above selected activity model $M_{C1}$ as the weight adjustment model, wherein $M_{C1}$ includes No. 1, 2, 3, (Z-2) and (Z-1) operation content and the weight adjustment vocabulary C is "Location". Then the weight adjustor 114 finds out the weight adjustment vocabulary "Location" is recorded in the No. (Z-2) and No. (Z-1) operation content. Finally, the weight adjustor 114 finds out the first number $n_{c,m}$ of the weight adjustment vocabulary "Location" is 2.

In step S305, the weight adjustor 114 finds each of application titles is in the same operation content with the weight adjustment vocabulary in the weight adjustment model. Then the weight adjustor 114 counts the number of times that each of the above application titles appears in all the operation content of the at least one selected activity model $M_{Cm}$ (m=1~N) as the second number $n_{a,c,m}$.

Using the same example as shown above, the weight adjustor 114 finds the application title "Electronic map", which is corresponding to the weight adjustment vocabulary "Location". Then the weight adjustor 114 counts the number of times that the application title "Electronic map" appears in each of the operation content of the selected activity models $M_{C1}$, $M_{C2}$ and $M_{C3}$ as the second number $n_{a,c,m}$. Assuming that the application title "Electronic map" has been recorded 23 times in each of the operation content of the selected activity models $M_{C1}$, $M_{C2}$ and $M_{C3}$, then the weight adjustor 114 determines the second number $n_{a,c,m}$ of the weight adjustment vocabulary "Location" is 23.

In step S306, the weight adjustor 114 calculates a selected weight value $w_{c,m}$ (m=1~N) according to the first number $n_{c,m}$ and the second number $n_{a,c,m}$. In step S307, the weight adjustor 114 determines whether each of the selected activity models $M_{Cm}$ (m=1~N) calculate the corresponding selected weight values $w_{c,m}$ (m=1~N) or not. If each of the selected weight values $w_{c,m}$ (m=1~N) are all calculated, then the method proceeds to step S308; otherwise, the method returns to step S303.

In step S308, the weight adjustor 114 calculates a weight value $W_c$ according to each of the selected weight values $w_{c,m}$ (m=1~N), wherein the calculation of the weight value $W_c$ can be determined by the following equation:

$$W_C = (\Sigma_{j=1}^{N}(\tfrac{1}{2^j})w_{c,j})/(1-2^{-N})$$

In step S309, the weight adjustor 114 determines whether each of the at least one selected activity models $M_{Cm}$ (m=1~N) calculate the corresponding weight values $W_c$ or not. If each of the weight values $W_c$ are all calculated, then the method proceeds to step S310; otherwise, the method returns to step S302. In step S310, the weight adjustor 114 uses each of the weight values $W_c$ as the weight adjustment information and outputs the weight adjustment information to the recognizer 115.

Another embodiment of the present disclosure illustrates that the recognizer 115 outputs a speech recognition result according to the weight adjustment information and the speech input. In this embodiment, the recognizer 115 stores a recognition lexicon, wherein the recognition lexicon includes all the recognition vocabularies used while executing the functions of the electronic device 10. Also each recognition vocabulary has a corresponding weight value $W_c$. After the recognizer 115 receives the weight adjustment information output by the weight adjustor 114, the recognizer 115 uses the weight adjustment information to update the recognition lexicon, i.e. replacing the weight values $W_c$ corresponding to each of the recognition vocabularies in all the selected activity models with the weight values $W_c$ corresponding to the same recognition vocabularies in the recognition lexicon.

The recognizer 115 recognizes a recognized target vocabulary according to the speech input and the updated recognition lexicon, wherein the recognized target vocabulary is one of the target vocabularies in the updated recognition lexicon. Then the recognizer 115, from all the operation content, searches each of the function vocabularies belonging to the same operation content that the recognized target vocabulary belonging to and then sorts each of the searched function vocabularies according to the second numbers $n_{a,c,m}$. The display 120 displays the recognized target vocabulary and the sorted function vocabularies received from the recognizer 115. The user selects a recognized function vocabulary from all the sorted function vocabularies. Finally, the recognizer 115 receives the recognized function vocabulary, and then the recognizer 115 outputs the recognized target vocabulary and the recognized function vocabulary as a speech recognition result.

Figure 4:
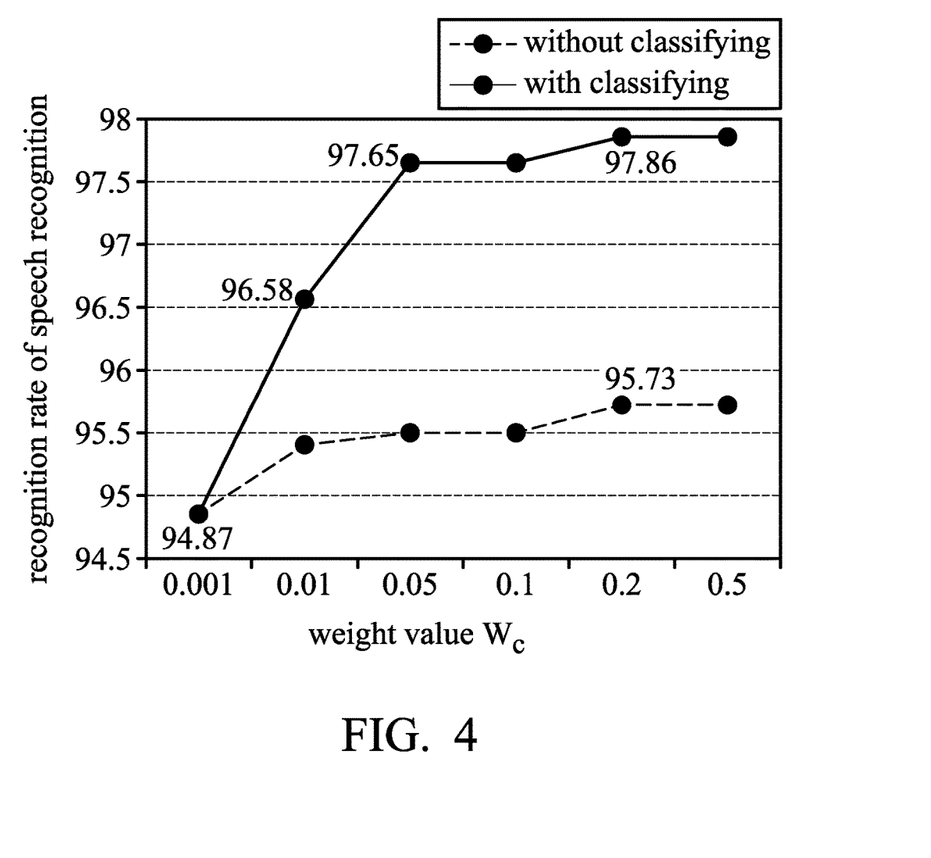
FIG. 4 shows a diagram which illustrates the relationship between classifying recognition vocabularies, the weights of the recognition vocabularies and the recognition rate of speech recognition.

FIG. 4 shows a diagram which illustrates the relationship between classifying recognition vocabularies, the weights of the recognition vocabularies and the recognition rate of speech recognition. In this embodiment, 1000 name vocabularies is chosen as the recognition lexicon of the recognizer 115 and each of the name vocabularies has an initial weight of $1/1000 = 0.001$. Then the recognizer 115 sequentially recognizes 906 speech inputs, wherein the 906 speech inputs include 593 name vocabularies. Finally, the recognition rate of speech recognition of the recognizer 115 is calculated. In the recognition progress, the operation record storage device 111 records the recognized name vocabulary and the device peripheral information of the electronic device 10 while recognizing. The activity model constructor 112 classifies the above recognized name vocabularies according to the LBG K-means algorithm. In order to understand the importance of classifying recognized name vocabularies, the present embodiment shows the recognition rate of speech recognition between with and without classifying.

From the experimental results of FIG. 4, the recognition lexicon with classifying name vocabularies and updating the weight adjustment information (solid line) has a higher recognition rate for speech recognition than the recognition lexicon without classifying name vocabularies and updating the weight adjustment information (dash line). From the weight adjustment method shown in FIG. 3, if the name vocabulary is recognized more times, then the name vocabulary has a larger weight value $W_c$. Therefore FIG. 4 shows a larger weight value $W_c$ also can enhance the recognition rate of speech recognition. This is because the speech recognition method of the present disclosure can adjust the weight values of name vocabularies in the recognition lexicon according to the frequency of use of the name vocabularies and the device peripheral information of the electronic device 10.

Figure 5:
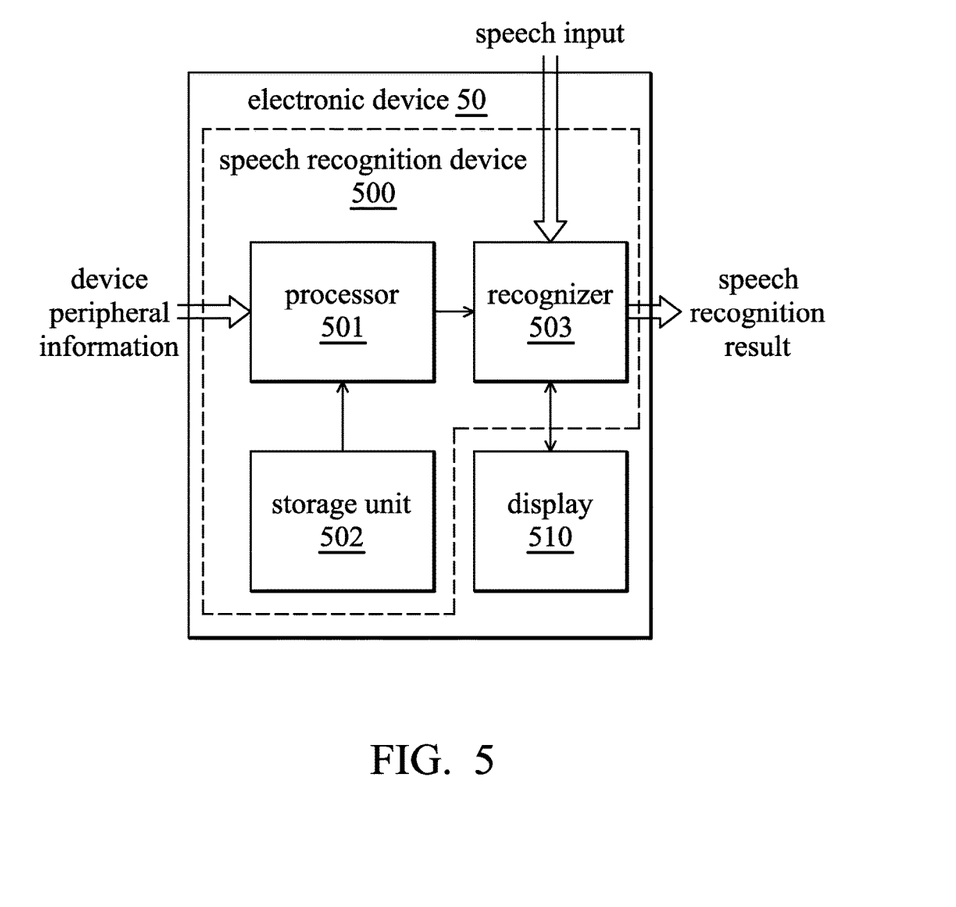
FIG. 5 is another embodiment of the speech recognition device 100 of FIG. 1.

FIG. 5 is another embodiment of the speech recognition device 100 of FIG. 1. In FIG. 5, the electronic device 50 outputs a speech recognition result according to a speech input and the current device peripheral information detected by the electronic device 50. The electronic device 50 includes the speech recognition device 500 and a display 510. The speech recognition device 500 includes a processor 501, a storage unit 502 and a recognizer 503. The processor 501 is coupled to the storage unit 502 and the recognizer 503. The recognizer 503 is coupled to the display 510. The storage unit 502 also stores a plurality of operation records which have been operated in the electronic device 50, wherein each of the operation records includes an operation content which is executed by the electronic device 50 and the device peripheral information detected by the electronic device 50 when the electronic device 50 executes the corresponding operation content.

The processor 501 receives the current device peripheral information detected by the electronic device 50. Then the processor 501 loads and executes a recognition network generation program, wherein the recognition network generation program executes the same steps as the activity model constructor 112, the activity predictor 113 and the weight adjustor 114. Finally, the processor 501 outputs weight adjustment information to the recognizer 503. The recognizer 503 recognizes a speech input by the weight adjustment information and outputs a speech recognition result.

While the present disclosure has been described by way of example and in terms of preferred embodiment, it is to be understood that the present disclosure is not limited thereto. On the contrary, it is intended to cover various modifications and similar arrangements (as would be apparent to a person skilled in the art). Therefore, the scope of the appended claims should be accorded the broadest interpretation so as to encompass all such modifications and similar arrangements.

What is claimed is:

1. A recognition network generation device, disposed in an electronic device, comprising:
    an operation record storage device storing a plurality of operation records of the electronic device, wherein each of the operation records comprises an operation content which is executed by the electronic device and a piece of device peripheral information detected by the electronic device when the electronic device executes the operation content, and wherein each operation content comprises at least a target vocabulary or a function vocabulary, and each operation content further comprises an application title;
    an activity model constructor coupled to the operation record storage device classifying the operation records into a plurality of activity models according to all the device peripheral information of the operation records;
    an activity predictor selecting at least one selected activity model from all the activity models according to a degree of similarity between each of the activity models and a current device peripheral information detected by the electronic device;
    a weight adjustor adjusting weights of a plurality of recognition vocabularies, wherein the recognition vocabularies correspond to the target vocabularies and function vocabularies of all operation contents of the at least one selected activity model; and
    a recognizer, receiving a speech input and being coupled to the weight adjustor to receive weight adjustment information output by the weight adjustor;
    wherein the weight adjustor adjusts the weight of each of the recognition vocabularies of all the operation contents of the at least one selected activity model according to a first number of times and a second number of times, wherein the first number of times is defined as the number of times that each of the recognition vocabularies appears in all of the operation contents of the at least one selected activity model and the second number of times is defined as the number of times that each of the application titles associated with each of the recognition vocabularies appears in all of the operation contents of the at least one selected activity model;
    wherein the recognizer stores a recognition lexicon and uses the weight adjustment information to update the recognition lexicon; and
    wherein the recognizer outputs a recognized target vocabulary according to the speech input and the updated recognition lexicon, wherein the recognized target vocabulary is one of the target vocabularies in the updated recognition lexicon.

2. The recognition network generation device of claim 1, wherein the activity model constructor converts each piece of the device peripheral information into a characteristic data respectively;
    wherein the activity model constructor classifies the characteristic data into the activity models according to the degree of similarity between all the characteristic data; and
    wherein each of the activity models generates a representative characteristic data respectively according to the characteristic data belonging to each of the activity models.

3. The recognition network generation device of claim 2, wherein the activity predictor converts the current device peripheral information into a current characteristic data;
   the activity predictor calculates a similarity coefficient corresponding to each of the activity models according to the degree of similarity between each of the representative characteristic data and the current device peripheral information; and
   the activity predictor selects the at least one selected activity model according to the similarity coefficient.

4. The recognition network generation device of claim 1, wherein the electronic device further comprises a display;
   wherein the recognizer, from all the operation contents, searches each of the function vocabularies belonging to the same operation content that the recognized target vocabulary belonging to, and sorts each of the searched function vocabularies according to the second number of times of the application title corresponding to each of the searched function vocabularies; and
   wherein the display is coupled to the recognizer and displays the recognized target vocabulary and the sorted function vocabularies received from the recognizer.

5. The recognition network generation device of claim 4, wherein a user selects a recognized function vocabulary from all the sorted function vocabularies; and
   the recognizer receives the recognized function vocabulary and outputs the recognized target vocabulary and the recognized function vocabulary as a speech recognition result.

6. The recognition network generation device of claim 1, wherein each of the device peripheral information comprises at least one of a sensing device status, a time status, a position status, a moving status, a wireless transmission interface status and a wired transmission interface status.

7. A recognition network generation method, comprising:
   storing, by an operation record storage device, a plurality of operation records of an electronic device, wherein each of the operation records comprises an operation content which is executed by the electronic device and a piece of device peripheral information detected by the electronic device when the electronic device executes the corresponding operation content, and wherein each operation content comprises at least a target vocabulary or a function vocabulary, and each operation content further comprises an application title;
   classifying, by an activity model constructor, the operation records into a plurality of activity models according to all the device peripheral information of the operation records;
   selecting, by an activity predictor, at least one selected activity model from all activity models according to degree of similarity between each of the activity models and a current device peripheral information detected by the electronic device;
   and adjusting, by a weight adjustor, weights of a plurality of recognition vocabularies, wherein the recognition vocabularies correspond to the target vocabularies and function vocabularies of all operation contents of the at least one selected activity model:
   wherein the weight adjustor adjusts the weight of each of the recognition vocabularies of all the operation contents of the at least one selected activity model according to a first number of times and a second number of times, wherein the first number of times is defined as the number of times that each of the recognition vocabularies appears in all of the operation contents of the at least one selected activity model and the second number of times is defined as the number of times that each of the application titles associated with each of the recognition vocabularies appears in all of the operation contents of all the at least one selected activity model;
   wherein a recognizer receives a speech input and is coupled to the weight adjustor to receive a weight adjustment information output by the weight adjustor;
   wherein the recognizer further stores a recognition lexicon and uses the weight adjustment information to update the recognition lexicon; and
   wherein the recognizer further outputs a recognized target vocabulary according to the speech input and the updated recognition lexicon, wherein the recognized target vocabulary is one of the target vocabularies in the updated recognition lexicon.

8. The recognition network generation method of claim 7, further comprising:
   converting, by the activity model constructor, each piece of the device peripheral information into a characteristic data respectively; and
   classifying, by the activity model constructor, the characteristic data into the activity models according to the degree of similarity between all the characteristic data, wherein each of the activity models generates a representative characteristic data respectively.

9. The recognition network generation method of claim 8, further comprising:
   converting, by the activity predictor, the current device peripheral information into a current characteristic data;
   calculating, by the activity predictor, a similarity coefficient corresponding to each of the activity models according to the degree of similarity between each of the representative characteristic data and the current device peripheral information; and
   selecting, by the activity predictor, at least one selected activity model according to the similarity coefficient.

10. The recognition network generation method of claim 7, further comprising:
    searching, by the recognizer, each of the function vocabularies belonging to the same operation content that the recognized target vocabulary belonging to from all the operation contents; and
    sorting, by the recognizer, all the searched function vocabularies according to the second number of times of the application title corresponding to each of the searched function vocabularies.

11. The recognition network generation method of claim 10, wherein a user selects a recognized function vocabulary from all the sorted function vocabularies; and
    outputting, by the recognizer, the recognized target vocabulary and the recognized function vocabulary as a speech recognition result.

12. The recognition network generation method of claim 7, wherein each of the device peripheral information comprises at least one of a sensing device status, a time status, a position status, a moving status, a wireless transmission interface status and a wired transmission interface status.

13. A recognition network generation device disposed in an electronic device comprising:
    a storage unit stores a plurality of operation records of the electronic device, wherein each of the operation records comprises an operation content which is executed by the electronic device and a piece of device peripheral information detected by the electronic device when the electronic device executes the operation content, and wherein each operation content comprises at least a target vocabulary or a function vocabulary, and each operation content further comprises an application title;

a recognizer; and a processor coupled to the storage unit loads and performs a recognition network generation program which includes the steps of:

classifying, by the processor, the operation records into a plurality of activity models according to all the device peripheral information of the operation records;

selecting, by the processor, at least one selected activity model from all the activity models according to degree of similarity between each of the activity models and a current device peripheral information detected by the electronic device;

adjusting, by the processor, weights of a plurality of recognition vocabularies, wherein the recognition vocabularies correspond to the target vocabularies and function vocabularies of all operation contents of the at least one selected activity model; and recognizing, by the recognizer, a speech input by a weight adjustment information and outputs a speech recognition result;

wherein the processor adjusts the weight of each of the recognition vocabularies of all the operation contents of the at least one selected activity model according to a first number of times and a second number of times, wherein the first number of times is defined as the number of times that each of the recognition vocabularies appears in all of the operation contents of the at least one selected activity model and the second number of times is defined as the number of times that each of the application titles associated with each of the recognition vocabularies appears in all of the operation contents of the at least one selected activity model.

14. The recognition network generation device of claim 13, wherein classifying, by the processor, the operation records into a plurality of activity models according to all the device peripheral information of the operation records further comprising:

converting each piece of the device peripheral information into a characteristic data respectively;

classifying the characteristic data into the activity models according to the degree of similarity between all the characteristic data; and generating, by each of the activity models, a representative characteristic data respectively according to the characteristic data belonging to each of the activity models.

15. The recognition network generation device of claim 13, wherein each of the device peripheral information comprises at least one of a sensing device status, a time status, a position status, a moving status, a wireless transmission interface status and a wired transmission interface status.

* * * * *